United States Patent [19]

Takenaka et al.

[11] Patent Number: 4,704,034

[45] Date of Patent: Nov. 3, 1987

[54] APPARATUS FOR DETECTING A GAP IN THE JUNCTION AREA ON A FOLDED BOX

[75] Inventors: Hiroyuki Takenaka; Tatsuhiko Shigemura, both of Hiroshima; Masashi Waseda, Mihara; Toshiaki Miura, Mihara; Noriyuki Hoshino, Mihara; Mitsunori Nakashima, Hiroshima, all of Japan

[73] Assignee: Mitsubishi Jukogyo Kabushiki Kaisha, Tokyo, Japan

[21] Appl. No.: 813,668

[22] Filed: Dec. 26, 1985

[30] Foreign Application Priority Data

Dec. 26, 1984 [JP] Japan ............................... 59-276662

[51] Int. Cl.[4] ............................................ G01N 21/84

[52] U.S. Cl. .................................................... 356/429

[58] Field of Search ............................... 356/429–431, 356/237; 250/562, 572, 227

[56] References Cited

U.S. PATENT DOCUMENTS 3,676,690 7/1972 McMillin et al. .................. 250/227

4,371,783 2/1983 Grimmell et al. .................. 250/227

*Primary Examiner*—R. A. Rosenberger

*Assistant Examiner*—Crystal Cooper

*Attorney, Agent, or Firm*—Toren, McGeady & Associates

[57] ABSTRACT

An apparatus for detecting a gap in the junction area on a folded box which is made of a sheet of smooth corrugated fiberboard by folding the latter while both the folded ends are located opposite to one another with the gap interposed therebetween. The apparatus includes detectors which are disposed along the moving track of the folded box. Each of the detectors includes a slit formed on the moving track at a substantially right angle relative to the latter, the width of the slit being dimensioned more than that of the gap in the junction area on the box, two inclined passages formed in the detector to reach the slit, each of the inclined passages having the substantially same inclination angle relative to the moving track, a light beam emitting mechanism disposed in one of the inclined passages to emit light beam toward the slit and a number of optical fibers longitudinally disposed in the other inclined passage so as to allow reflected light beam to be transmitted therethrough.

According to the invention it is possible to detect abnormality relative to quality of the folded box and moreover carry out monitoring in the course of many steps of production. When an incorrectly folded box is detected, it is removed from the production line by operating a removing device which can be operatively associated with an automatic control system. Thus, maintaining high quality of products and saving of manpower are assured.

7 Claims, 10 Drawing Figures

APPARATUS FOR DETECTING A GAP IN THE JUNCTION AREA ON A FOLDED BOX

BACKGROUND OF THE INVENTION (i) Field of the Invention

The present invention relates to a detecting apparatus for monitoring abnormality during the step of producing a folded fiberboard box in a fiberboard box making machine and more particularly to an apparatus for detecting abnormality relative to quality of a folded box at the production stage where a sheet of corrugated fiberboard is folded while both the folded ends are located opposite to one another with a certain gap interposed therebetween.

(ii) Prior Art Statement

The conventional box making machine is constructed so as to make a fiberboard box by folding a square sheet of smooth corrugated fiberboard which is cut to predetermined dimensions by means of a corrugator which serves as a preprocessing line. Specifically, it has many functions which comprise cutting of unnecessary corners, scribing of contour lines, printing, folding, gluing and preforming prior to assembling. Due to fact that the conventional box making machine has various processing functions as mentioned above, each of processing functions is achieved by operating a specially designed unit and a series of fiberboards are successively conveyed while a certain distance is maintained between the adjacent fiberboards at every time when a certain function is completed in a series of processing units.

FIG. 6 is a fragmental schematic side view of the conventional box making machine. In the drawing reference numeral 1 designates a folded fiberboard box which is made of a sheet of smooth corrugated fiberboard by folding the latter in a folding unit. After completion of making of the folded box 1 the latter is discharged from the folding unit by rotating a pair of guide rolls 3 and thereafter thus discharged boxes 1 are piled one above another in the space as defined between both retaining plates 4 in the layered structure. After a number of folded boxes 1*a* are piled one above another in the above-described manner, the lowermost folded box 1*b* is conveyed away from the layered structure to reach the next processing unit 6 such as a counter unit or the like and this step of operation is repeated successively.

However, it is found with respect to the conventional box making machine that abnormality relative to quality as corrugated fiberboard box tends to take place in the area located in vicinity of the above-mentioned units in the following manner. FIG. 7 shows a folded box 1*b* as seen in the direction as identified by an arrow mark VII in FIG. 6, wherein FIG. 7(A) shows a normally folded box by way of perspective view and FIG. 7 (B) shows a corrugated fiberboard box which is incorrectly folded in the so-called fishtail shape with some projection from the folded part recognized. In the case as shown in FIG. 7(B) the gap in the junction area has a dimension of $G_1$ at the upper part but it has a different dimension of $G_2$ at the lower part of the folded box as seen in the drawing.

This abnormality in shape takes place when folding lines, that is, working lines are scribed incorrectly. In some case it takes place because of incorrect relative displacement of the folded part which is caused under the influence of shearing force which is developed during conveyance of the folded box 1*b* while the latter is depressed by many other folded boxed 1*a*. Once such an incorrectly folded box is produced, this leads to reduction of commercial value thereof. In addition it is necessary to keep some inspectors in a stacker section in order to inspect quality of all products to remove incorrectly folded boxes.

SUMMARY OF THE INVENTION

Hence, the present invention has been made with the foregoing background in mind and its object resides in providing an apparatus for detecting abnormality relative to quality of folded boxes which is entirely free from the drawbacks inherent to the conventional apparatus as mentioned above.

Another object of the present invention is to provide an apparatus for detecting abnormality appearing in the junction area on a corrugated fiberboard folded box immediately after completion of folding or adhering operation in a box making machine.

To accomplish the above objects there is proposed according to the invention an apparatus of the earlier-mentioned type which is constructed in the following manner.

(I) An apparatus for detecting a gap in the junction area on a folded box which is made of a sheet of smooth corrugated fiberboard by folding the latter while both the folded ends are located opposite to one another with the gap interposed therebetween, characterized in that the apparatus includes detectors disposed along the moving track of the box in the spaced relation, wherein each of the detectors includes a slit formed on the moving track at a substantially right angle relative to the latter, the width of the slit being dimensioned more than that of the gap in the junction area on the box, two inclined passages formed in the detector to reach the slit, each of the inclined passages having the substantially same inclination angle relative to the moving track, a light beam emitting mechanism disposed in one of the inclined passages to emit a light beam toward the slit and a number of optical fibers longitudinally disposed in the other inclined passage so as to allow reflected light beam to be transmitted therethrough. (II) An apparatus for detecting a gap in the junction area on a folded box which is made of a sheet of smooth corrugated fiberboard by folding the latter while both the folded ends are located opposite to one another with the gap interposed therebetween, characterized in that the apparatus includes detectors disposed along the moving track of the box in the spaced relation, wherein each of the detectors includes a slit formed on the moving track at a substantially right angle relative to the latter, the width of the slit being dimensioned more than that of the gap in the junction area on the box, two inclined passages formed in the detector to reach the slit, each of the inclined passages having the substantially same inclination angle relative to the moving track, a light beam emitting mechanism disposed in one of the inclined passages to emit light beam toward the slit, a number of optical fibers longitudinally disposed in the other inclined passage so as to allow reflected light beam to be transmitted therethrough and output processing means for converting thus transmitted light beam into electric signal, calculating the electric signal and generating output in response to thus calculated signal.

According to the invention the apparatus is so constructed that it includes detectors each of which is formed with a slit on which a gap in the junction area on a folded box is adapted to move, the width of the slit being determined more than that of the gap, wherein each of the detectors includes two inclined passages both of which are extended at a predetermined inclination angle to reach the slit, one of the inclined passages having a bundle of optical fibers and/or a light source disposed therein so as to allow light to be emitted toward the slit and the other one having another bundle of optical fibers disposed therein through which reflected light beam is transmitted toward the output processing means. Thus, when light beam projected on the gap in the junction area on a folded box through the slit fails to be received by means of the bundle of optical fibers through which reflected light beam is transmitted, this leads to no generation of output in response to receipt of reflected light beam, resulting in the gap in the junction area being detected.

It should be noted that receipt of reflected light beam and failure of receipt of the same are converted into electric signal which is then calculated to generate output.

Owing to arrangement of the apparatus of the invention the following advantageous features are assured.

The apparatus of the invention makes it possible to detect abnormality relative to quality of folded boxes made of smooth corrugated fiberboard and moreover carry out monitoring during the steps of production. Thus, any incorrectly folded box can be removed from the box production line by operating a removing device or the like which is operatively associated with an automatic control system. As a result, high quality of products and saving of manpower are assured.

BRIEF DESCRIPTION OF THE DRAWINGS

The accompanying drawings will be briefly described below.

FIG. 3 is an enlarged sectional view of light emitting and receiving sections taken in line III—III in FIG. 2, wherein FIGS. 3(A) to (C) show three types of output processing units.

FIG. 7 is a perspective view of a folded box as seen in the direction as identified by an arrow mark VII in FIG. 6, wherein

DETAILED DESCRIPTION OF THE PREFERRED EMBODIMENTS

Now, the present invention will be described in greater detail hereunder with reference to the accompanying drawings which schematically illustrate preferred embodiments thereof.

Figure 1:
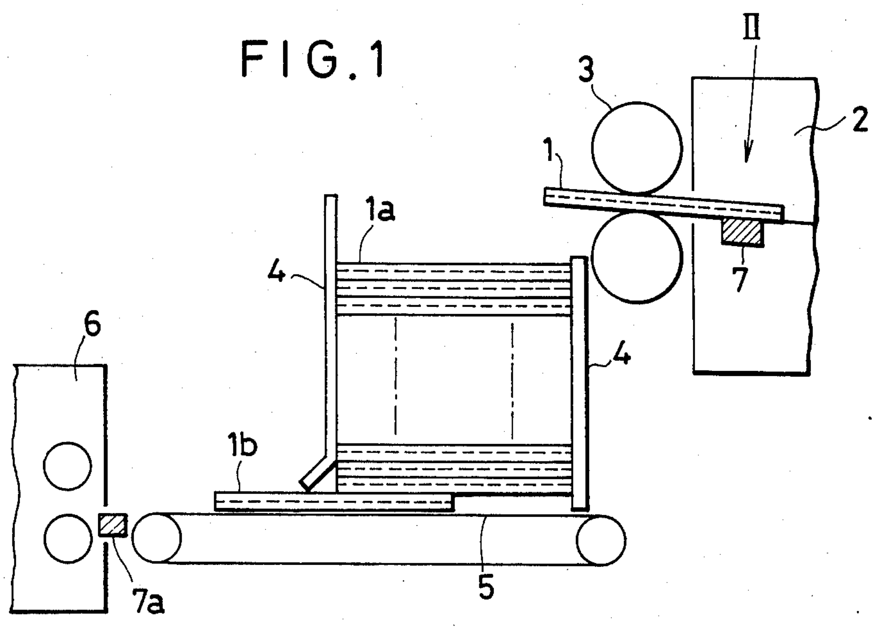
FIG. 1 is a fragmental schematic side view of a box making machine for producing folded boxes made of smooth corrugated fiberboard in which a detecting appartus in accordance with an embodiment of the invention is incorporated.
Figure 2:
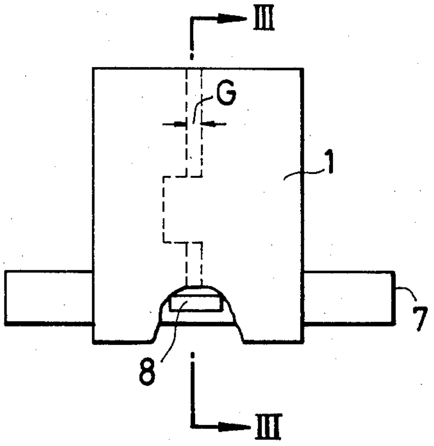
FIG. 2 is a fragmental plan view as seen in the direction as identified by an arrow mark II in FIG. 1.
Figure 4:
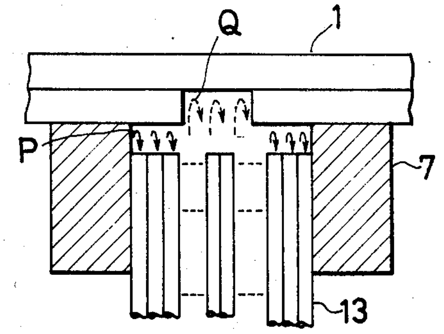
FIG. 4 is a sectional view taken in line IV—IV in FIG. 3(A).
Figure 3:
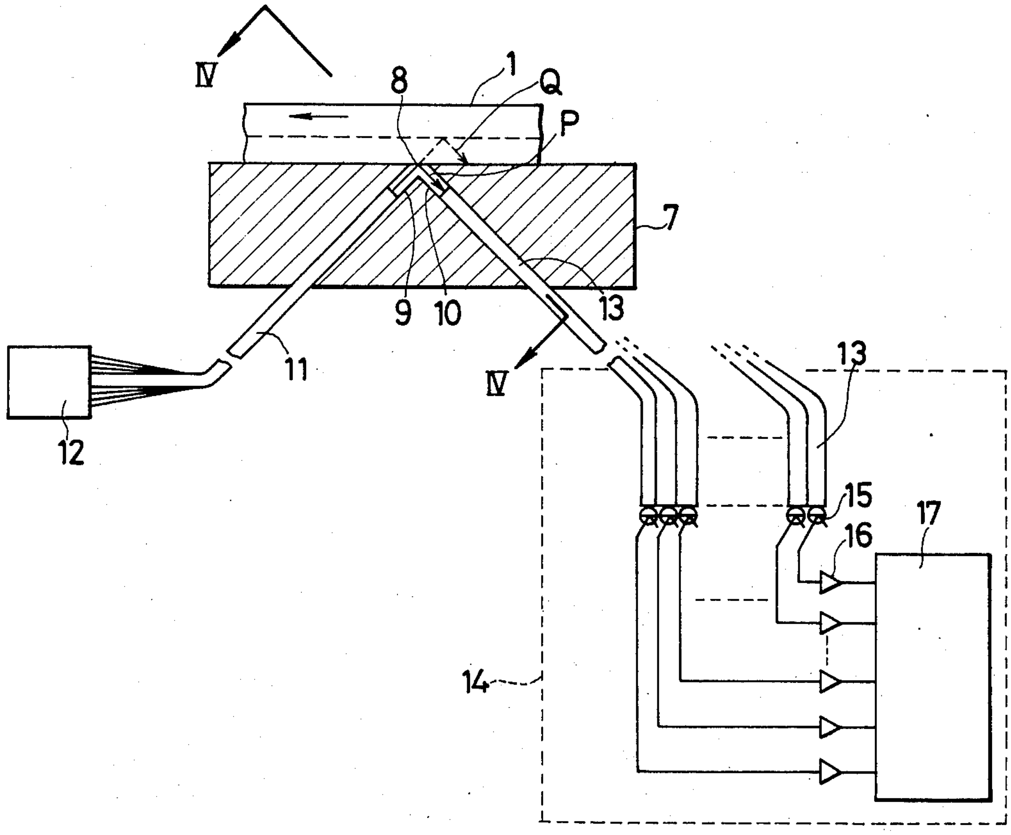
Figure 3:
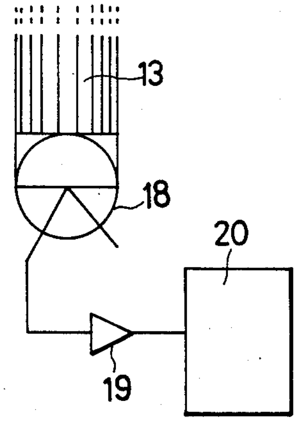
Figure 3:
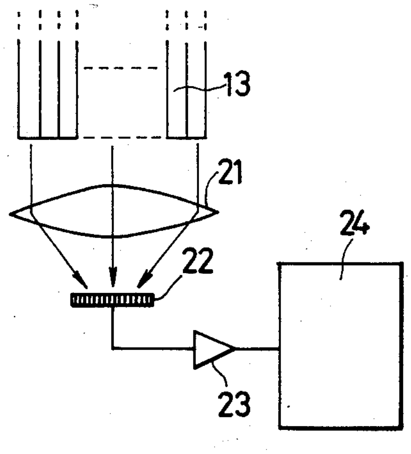
Figure 5:
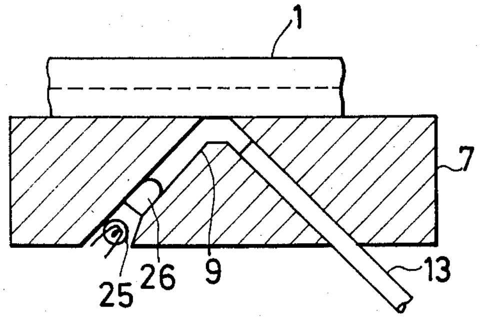
FIG. 5 is an enlarged sectional view of light emitting and receiving sections in accordance with another embodiment of the invention, taken in line III—III in FIG. 2.
Figure 6:
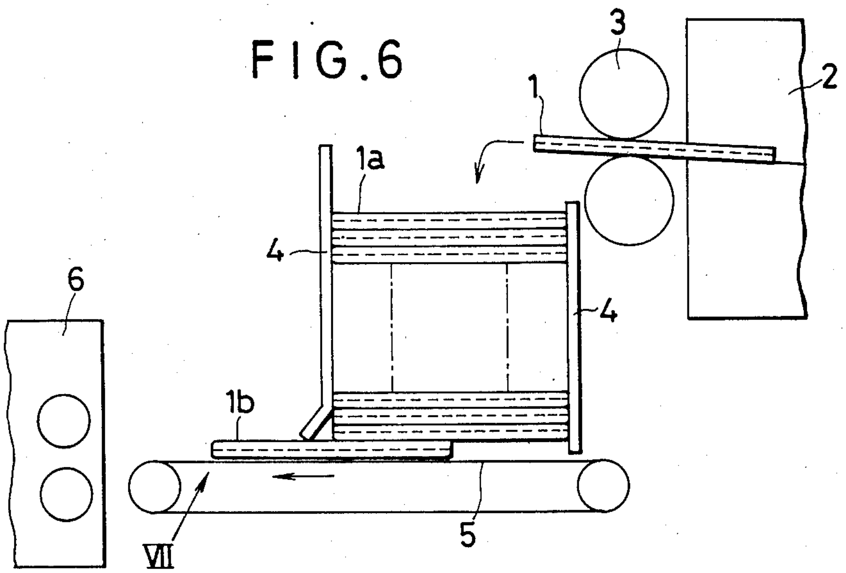
FIG. 6 is a fragmental schematic side view of a conventional box making machine similar to FIG. 1.

FIG. 1 is a fragmental side view of a box making machine in which a detecting apparatus in accordance with an embodiment of the invention is incorporated. FIG. 2 is a fragmental plan view of the machine as seen in the direction as identified by an arrow mark II in FIG. 1. FIG. 3(*a*) is an enlarged sectional side view taken on line III—III in FIG. 2, particularly illustrating how a light beam emitting section and a light beam receiving section are arranged. FIG. 4 is another sectional view taken in line IV—IV in FIG. 3(*a*). FIG. 5 is an enlarged sectional side view similar to FIG. 3(*a*), particularly illustrating the detecting apparatus in accordance with another embodiment of the invention.

In the drawings reference numerals 7 and 7*a* designate a detecting block respectively which is located at the position in the proximity of a gap which appears in the junction area of a folded corrugated fiberboard box (hereinafter referred to as folded box or box). The detecting block 7 serves as a detector which is located just behind a folding unit 2 in which folding operation is performed for a series of corrugated fiberboards, whereas the detecting block 7*a* serves as a detector which is located behind a piling section in which a plurality of folded boxes 1*a* are piled one above another in the layered structure while certain adhesive force is imparted to each of the boxes. It should be noted that the present invention should not be limited only to their arrangement as shown in the drawings. Alternatively, they may be located at any properly determined position. As is apparent from FIG. 2, the detector 7 is formed with a slit 8 of which width is dimensioned more than the distance of the gap G in the junction area of the box 1. Further, as shown in FIG. 3(A), the detector 7 includes a light beam emitting passage 9 and a light beam receiving passage 10 both of which extend toward the slit 8 in the inclined state until they intersect one another there. A bundle of optical fibers 11 are inserted through the light beam emitting passage 9 and one end of the optical fibers 11 is jointed to a light source 12 from which light beam is emitted. On the other hand, a bundle of optical fibers 13 are inserted through the light beam receiving passage 10 and one end of the optical fibers 13 is jointed to an output processor 14.

FIGS. 3(B) and (C) schematically show other examples of the output processor 14. Referring to FIG. 3(A) again, the output processor 14 has a plurality of light beam receiving elements 15 such as photo-transistor, photo-diode or the like which are connected to the optical fibers 13 through which received light beam is transmitted thereto and the light beam receiving elements 15 are electrically connected to a calculator 17 via a plurality of amplifiers 16. Specifically, the calculator 17 is so constructed that recognizing is digitally effected with the aid of function to be described later as to whether light beam is received or not, conversion of thus obtained result to an amount of gap G in the junction area of a single box is carried out and moreover fluctuation in amount of gap in the junction area is checked so as to generate a signal which represents abnormality relative to quality.

Next, the output processor as shown in FIG. 3(B) is so constructed that the bundle of optical fibers 13 are jointed to a single light beam receiving element 18 which is in turn electrically connected to the calculator 20 via a single amplifier 19. In this case the calculator 20 is so constructed that electrically converted signal relative to an intensity of received light beam is analogically recognized with the aid of function to be described later and conversion of thus recognized signal to an amount of gap G in the junction area is then carried out so as to generate signal which represents abnormality relative to quality. On the other hand, the output processor as shown in FIG. 3(C) is so constructed that light beam which is received via a plurality of longitudinally arranged optical fibers 13 is collected by means of a lens 21 and thus collected light beam is detected by means of an image sensor 22 which is in turn electrically connected to the calculator 24, via a single amplifier 23. Received light beam is analogically recognized in the calculator 24 in the same manner as in the case shown in FIG. 3(B) whereby it is processed therein in the form of signal.

Next, FIG. 5 schematically illustrates a detecting apparatus in accordance with another embodiment of the invention in which another type of light beam section is employed. Instead of the light beam emitting optical fibers in the foregoing embodiment the combination of lamp 25 such as tungsten lamp or the like and lens 26 is incorporated in the light beam emitting passage 9.

Next, operation of the detecting apparatus of the invention as constructed in the above-described manner will be described below.

A smooth corrugated fiberboard (hereinafter referred to simply as fiberboard) is processed by way of the steps of printing in a printing unit (not shown), slitting in a slotter unit (not shown), folding in the folding unit 2 to form a box 1, piling in the piling section in the layered structure and then moving to the next unit. During the steps of processing as mentioned above the box 1 or 1*b* moves past the detector 7 or 7*a*. At the time when it moves past there the gap G in the junction area of the box 1 or 1*b* is caused to move across the slit 8 of the detector 7 or 7*a*. At this moment the gap G is exposed to light beam which is transmitted from the light source 12 or the lamp 25 via the optical fibers 11 or the lens 26 in the light beam emitting passage 9. As shown in FIGS. 3(A) and 4, light beam projected on the area excluding the gap is reflected in the direction as identified by an arrow mark P and thus reflected light beam is then transmitted through the optical fibers 13. However, light beam projected on the gap area is reflected in the direction as identified by an arrow mark Q, resulting in thus reflected light beam failing to be transmitted through the optical fibers 13.

Figure 7A:
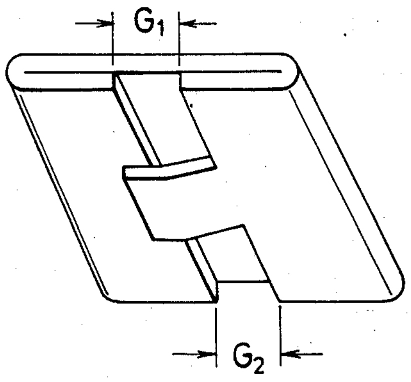
FIG. 7(A) shows a correctly folded box and FIG. 7(B) shows an incorrectly folded box made of smooth corrugated fiberboard.
Figure 7B:
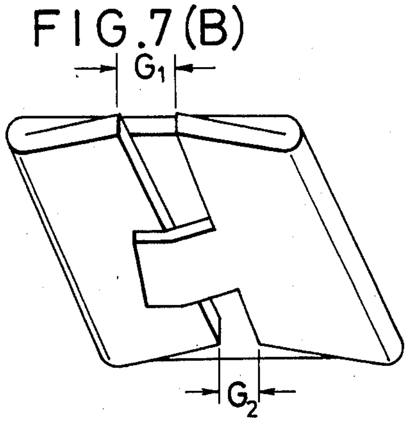

Thus, light beam reflected from the area excluding the gap in the junction area is transmitted through the optical fibers 13 and it is then represented by the word of "brightness", whereas light beam from the gap area is represented by the word of "darkness". Brightness and darkness as mentioned above are identified by means of the light beam receiving elements 15 in the output processor 14 in FIG. 3(A) and the result of identification is transmitted to the calculator 17 in the form of ON-OFF signal which is an output signal from the amplifiers 16. Thus transmitted signal is converted to an amount of gap G in the junction area in the calculator 17 whereby fluctuation of an amount of gap G in the junction area of a single box can be checked easily and reliably. When it is found that amounts of gaps $G_1$ and $G_2$ exceed a predetermined allowable value, an alarm signal which represents abnormality relative to quality of the box is generated, as is the case shown in FIG. 7(B).

In the case of the output processor as shown in FIG. 3(B), output from the optical fibers 13 relative to brightness and darkness is received by means of a single light beam receiving element 18 and an intensity of received light beam is electrically converted to signal in the form of analogical signal which corresponds to an amount of gap in the junction area. On the other hand, in the case of the output processor as shown in FIG. 3(C), resolution is improved remarkably compaired with the case in FIG. 3(B). Owing to this a reduced amount of received light beam along the boundary of the gap in the junction area can be clearly resolved and identified. In this case the calculator 24 functions in the same manner as the first-mentioned calculator 20.

While the present invention has been described above only with respect to a few preferred embodiments, it should of course be understood that it should not be limited only to them but various changes or modifications may be made in any acceptable manner without departure from the spirit and scope of the invention as defined by the appended claims.

We claim:

1. An apparatus for detecting a gap in the junction area on a folded box having which is folded ends made of a sheet of smooth corrugated fiberboard by folding the latter while both the folded ends are located opposite to one another with said gap interposed therebetween, characterized in that said apparatus includes plural detecting means disposed along a moving track of the box in the spaced relation, wherein each of said detecting means includes a slit formed on the moving track at a substantially right angle relative to the latter, the width of said slit being determined more than that of the gap in the junction area on the box, two inclined passages formed in the detecting means to reach the slit, each of said inclined passages having the substantially same inclination angle relative to the moving track, a light beam emitting mechanism disposed in one of the inclined passages to emit light beam toward the slit and a number of optical fibers longitudinally disposed in the other inclined passage so as to allow reflected light beam to be transmitted therethrough.

2. An apparatus for detecting a gap in the junction area on a folded box having folded ends which is made of a sheet of smooth corrugated fiberboard by folding the latter while both the folded ends are located opposite to one another with said gap interposed therebetween, characterized in that said apparatus includes plural detecting means disposed along a moving track of the box in the spaced relation, wherein each of said detecting means includes a slit formed on the moving track at a substantially right angle relative to the latter, the width of said slit being determined more than that of the gap in the junction area on the box, two inclined passages formed in the detecting means to reach the slit, each of said inclined passages having the substantially same inclination angle relative to the moving track, a light beam emitting mechanism disposed in one of the inclined passages to emit light beam toward the slit, a number of optical fibers longitudinally disposed in the other inclined passage so as to allow reflected light beam to be transmitted therethrough and output processing means for converting thus transmitted light beam into electric signal, calculating said electric signal and generating output in response to thus calculated signal.

3. An apparatus as defined in claim 2, characterized in that said output processing means comprises a single or a plurality of light beam receiving elements jointed to said optical fibers, a single or a plurality of amplifiers electrically connected to each said light beam receiving element and a calculator electrically connected to each said amplifier.

4. An apparatus as defined in claim 1, characterized in that said light beam emitting mechanism comprises a light source from which light beam is emitted and a plurality of optical fibers.

5. An apparatus as defined in claim 2, characterized in that said light beam emitting mechanism comprises a light source from which light beam is emitted and a plurality of optical fibers.

6. An apparatus as defined in claim 1, characterized in that said light beam emitting mechanism comprises a light source from which light beam is emitted and a lens.

7. An apparatus as defined in claim 2, characterized in that said light beam emitting mechanism comprises a light source from which light beam is emitted and a lens.

* * * * *